(12) United States Patent
Munje et al.

(10) Patent No.: US 7,835,722 B2
(45) Date of Patent: Nov. 16, 2010

(54) SYSTEM AND METHOD FOR OVER THE AIR PROVISIONING OF A MOBILE COMMUNICATIONS DEVICE

(75) Inventors: Arun Munje, Kanata (CA); Christopher Smith, Burlington (CA)

(73) Assignee: Research In Motion Limited, Waterloo (CA)

( * ) Notice: Subject to any disclaimer, the term of this patent is extended or adjusted under 35 U.S.C. 154(b) by 1361 days.

(21) Appl. No.: 10/981,424

(22) Filed: Nov. 4, 2004

(65) Prior Publication Data

US 2006/0094354 A1    May 4, 2006

(51) Int. Cl.
*H04M 00/66* (2006.01)

(52) U.S. Cl. ............... 455/410; 455/411; 455/412.1; 455/415; 380/258; 380/261

(58) Field of Classification Search ................ 455/39, 455/13.2, 517, 524, 502, 410, 411, 412, 415; 380/258, 261
See application file for complete search history.

(56) References Cited

U.S. PATENT DOCUMENTS

| | | | |
|---|---|---|---|
| 6,144,849 A | 11/2000 | Nodoushani et al. | |
| 6,381,454 B1 | 4/2002 | Tiedemann, Jr. et al. | |
| 6,418,130 B1 * | 7/2002 | Cheng et al. | 370/331 |
| 6,529,729 B1 | 3/2003 | Nodoushani et al. | |
| 6,725,056 B1 * | 4/2004 | Moles et al. | 455/524 |
| 6,799,203 B2 | 9/2004 | Oommen | |
| 6,804,707 B1 | 10/2004 | Ronning | |
| 6,804,722 B1 | 10/2004 | Nishi | |
| 6,950,660 B1 * | 9/2005 | Hsu et al. | 455/456.1 |
| 7,103,018 B1 * | 9/2006 | Hansen et al. | 370/328 |
| 7,107,051 B1 * | 9/2006 | Walker | 455/432.1 |
| 7,107,620 B2 * | 9/2006 | Haverinen et al. | 726/29 |
| 7,236,783 B2 * | 6/2007 | Gould | 455/435.1 |
| 7,457,627 B2 * | 11/2008 | Knaebchen et al. | 455/452.2 |

(Continued)

FOREIGN PATENT DOCUMENTS

DE    100 46 345 A1    3/2002

(Continued)

OTHER PUBLICATIONS

European Search Report; European Patent Office; Apr. 15, 2005; 6 pages.

(Continued)

*Primary Examiner*—Yuwen Pan
(74) *Attorney, Agent, or Firm*—The Danamraj Law Group, P.C.

(57) ABSTRACT

A mobile communications device includes logic means operable to generate a request that is transmitted to a first network node. The request includes a personal information number and at least one device identifier associated with the mobile communications device. The mobile communications device also includes logic means operable to receive a response from the first network node. The response includes a URL and a session ID based upon the personal information number and the at least one device identifier associated with the mobile communications device. The mobile communications device further includes logic means operable to establish a communication session with a second network node to provision at least one aspect of the mobile communications device by transmitting the URL and the session ID to the second network node.

37 Claims, 5 Drawing Sheets

U.S. PATENT DOCUMENTS

| | | | |
|---|---|---|---|
| 2002/0029269 A1 | 3/2002 | McCarty et al. | |
| 2002/0062379 A1 | 5/2002 | Widegren et al. | |
| 2002/0123335 A1* | 9/2002 | Luna et al. | 455/419 |
| 2003/0027566 A1* | 2/2003 | Weiner | 455/426 |
| 2003/0028649 A1 | 2/2003 | Uhik et al. | |
| 2003/0060210 A1 | 3/2003 | Ravishankar et al. | |
| 2003/0211842 A1* | 11/2003 | Kempf et al. | 455/411 |
| 2004/0006538 A1* | 1/2004 | Steinberg et al. | 705/39 |
| 2004/0009749 A1* | 1/2004 | Arazi et al. | 455/41.2 |
| 2004/0054719 A1 | 3/2004 | Daigle et al. | |
| 2004/0142693 A1* | 7/2004 | Feder et al. | 455/443 |
| 2005/0014489 A1* | 1/2005 | Zhigang | 455/414.2 |
| 2005/0014505 A1* | 1/2005 | Wong et al. | 455/445 |
| 2005/0113070 A1* | 5/2005 | Okabe | 455/411 |
| 2005/0113114 A1* | 5/2005 | Asthana | 455/456.3 |
| 2005/0164680 A1* | 7/2005 | Gould | 455/412.1 |
| 2005/0250470 A1* | 11/2005 | Wen et al. | 455/405 |
| 2006/0063517 A1* | 3/2006 | Oh et al. | 455/415 |
| 2006/0154649 A1* | 7/2006 | Pedersen et al. | 455/412.1 |
| 2006/0270428 A1* | 11/2006 | Rajkotia et al. | 455/517 |

FOREIGN PATENT DOCUMENTS

| | | |
|---|---|---|
| WO | WO 02/104046 A1 | 12/2002 |
| WO | WO 03/024139 A2 | 3/2003 |
| WO | WO 03/096724 A1 | 11/2003 |

OTHER PUBLICATIONS

European Search Report; European Patent Office; Mar. 24, 2005; 9 pages.

* cited by examiner

SYSTEM AND METHOD FOR OVER THE AIR PROVISIONING OF A MOBILE COMMUNICATIONS DEVICE

TECHNICAL FIELD OF THE APPLICATION

The present application relates, in general, to wireless packet data service networks and, in particular, to a system and method for over the air provisioning of a mobile communications device operable to be disposed in the wireless packet data service network.

BACKGROUND

It is becoming commonplace to use wireless packet data service networks for effectuating data sessions with mobile communications devices. For example, mobile communications devices may be wirelessly synchronized with a desktop computer such that information is transferred therebetween to update each. Likewise, many mobile communications devices are capable of sending and receiving SMS messages and e-mails as well as conducting WAP sessions. With many of these services, it has been found that the mobile communications device must be configured by the user in order for the user to take full advantage of the capabilities of the mobile communications device. It would be desirable for this configuration process to be as seamless as possible for the user. Accordingly, a need has arisen for system and method for over the air provisioning of the mobile communications device using the wireless packet data service network.

SUMMARY

As disclosed herein, a network system is provided for over the air provisioning of a mobile communications device such that the user of the mobile communications device may take full advantage of the capabilities of the device. The over the air provisioning may take place over a wireless packet data service network comprising one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (CDMA) network, a Universal Mobile Telecommunications System (UMTS) network or the like.

The network system includes a first network node, which may be a relay network having a registration server, that is operable to receive a request transmitted by the mobile communications device. This request includes a personal information number and at least one device identifier associated with the mobile communications device such as its IMEI, IMSI, ESN, MIN, ICCID, IP address or the like. Thereafter, the first network node provides a response to the mobile communications device. The response includes a URL and a session ID which may be appended to the Uniform Resource Locator (URL). The session ID is based upon the personal information number and the at least one device identifier associated with the mobile communications device such as by hashing the personal information number and the at least one device identifier associated with the mobile communications device.

The network system also includes a second network node, which may be a provisioning system and may be colocated or integrated with the first network node. The second network node is operable to receive a query by the first network node that includes the personal information number and the at least one device identifier associated with the mobile communications device, generate the session ID, associate the session ID with the URL and transmit a reply to the first network node that includes the URL and the session ID. The second network node is also operable to establish a communication session with the mobile communications device upon receiving the URL and the session ID transmitted by the mobile communications device. In this communication session, at least one aspect of the mobile communications device may be provisioned over the air. In one embodiment, the second network node must receive the URL and the session ID within a predetermined time window in order to establish the communication session.

BRIEF DESCRIPTION OF THE DRAWINGS

For a more complete understanding of the features and advantages of the present method and mobile device, reference is now made to the detailed description along with the accompanying figures in which corresponding numerals in the different figures refer to corresponding parts and in which.

DETAILED DESCRIPTION OF THE DRAWINGS

While various embodiments of a mobile communications device operating within a network system are discussed in detail below, it should be appreciated that the present disclosure provides many applicable inventive concepts which can be embodied in a wide variety of specific contexts. The specific embodiments discussed herein are merely illustrative of specific ways to use the mobile communications device within the network system, and do not delimit the scope of the present disclosure.

Figure 1:
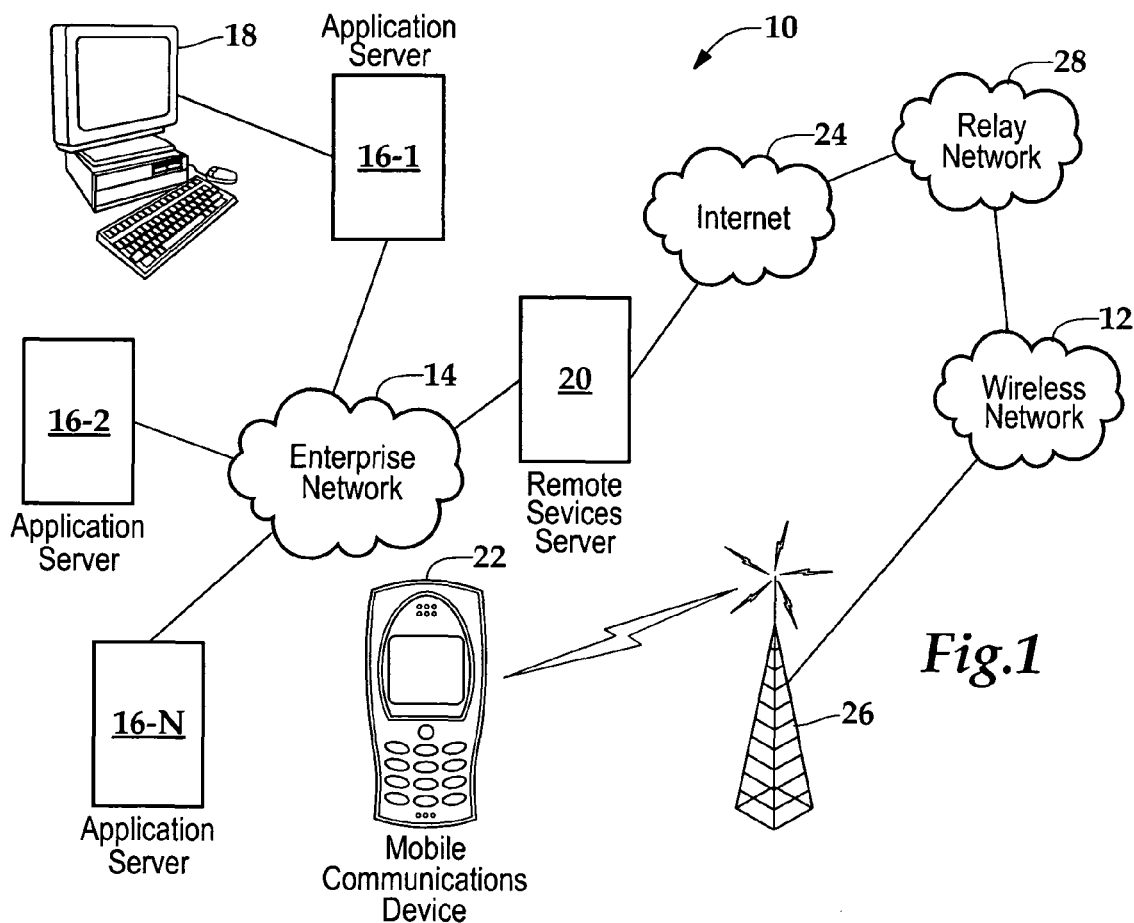
FIG. 1 depicts an exemplary network environment including a wireless packet data service network wherein an embodiment of the present method may be practiced.

Referring now to the drawings, and more particularly to FIG. 1, depicted therein is an exemplary network environment 10 including a wireless packet data service network 12 wherein an embodiment of the present method may be practiced. An enterprise network 14 for serving a plurality of corporate users, which may be a packet-switched network, can include one or more geographic sites and be organized as a local area network (LAN), a wide area network (WAN), a metropolitan area network (MAN) or the like. A number of application servers 16-1 through 16-N disposed as part of the enterprise network 14 are operable to provide or effectuate a host of internal and external services such as email, video mail, Internet access, corporate data access, messaging, calendaring and scheduling, information management and the like. Accordingly, a diverse array of personal information appliances 18 such as desktop computers, laptop computers, palmtop computers or the like may be operably networked to one or more of the application servers 16-*i*, i=1, 2, ..., N, with respect to the services supported in the enterprise network 14.

Additionally, a remote services server 20 may be interfaced with the enterprise network 14 for enabling a corporate user to access or effectuate any of the services from a remote location using a suitable mobile communications device (MCD) 22. A secure communication link with end-to-end encryption may be established that is mediated through an external IP network, i.e., a public packet-switched network such as the Internet 24, as well as the wireless packet data service network 12 operable with MCD 22 via suitable wireless network infrastructure that includes a base station 26. In one embodiment, a trusted relay network 28 may be disposed between the Internet 24 and the infrastructure of wireless packet data service network 12. By way of example, MCD 22 may be a data-enabled handheld device capable of receiving and sending messages, web browsing, interfacing with corporate application servers and the like.

For purposes of the present disclosure, the wireless packet data service network 12 may be implemented in any known or heretofore unknown mobile communications technologies and network protocols, as long as a packet-switched data service is available therein for transmitting packetized information. For instance, the wireless packet data service network 12 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 12 may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any 3rd Generation (3G) network. As will be seen hereinbelow, the embodiments of the present disclosure for provisioning MCD 22 will be described regardless of any particular wireless network implementation.

Figure 2:
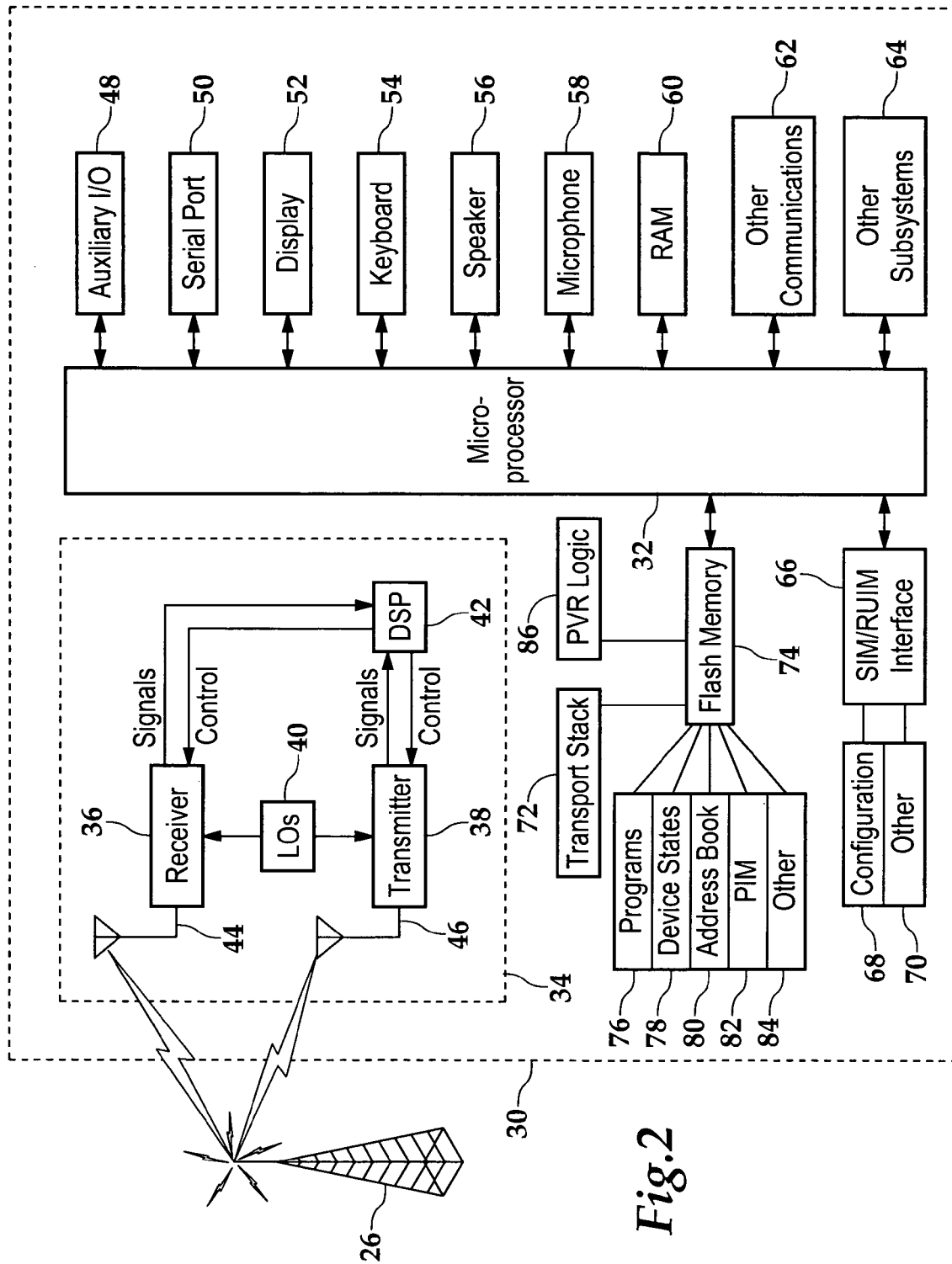
FIG. 2 depicts a block diagram of a mobile communications device according to one embodiment of the present disclosure.

FIG. 2 depicts a block diagram of a mobile communications device that is generally designated 30. It will be recognized by those skilled in the art upon reference hereto that although an embodiment of MCD 30 may comprise an arrangement similar to one shown in FIG. 2, there can be any number of variations and modifications, in hardware, software or firmware, with respect to the various modules depicted. Accordingly, the arrangement of FIG. 2 should be taken as illustrative rather than limiting with respect to the embodiments of the present disclosure. A microprocessor 32 providing for the overall control of MCD 30 is operably coupled to a communication subsystem 34 which includes a receiver 36 and transmitter 38 as well as associated components such as one or more local oscillator (LO) modules 40 and a processing module such as a digital signal processor (DSP) 42. As will be apparent to those skilled in the field of communications, the particular design of the communication module 34 may be dependent upon the communications network with which the mobile device is intended to operate.

In one embodiment, the communication module 34 is operable with both voice and data communications. Regardless of the particular design, however, signals received by antenna 44 through base station 26 are provided to receiver 36, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 42, and provided to transmitter 44 for digital-to-analog (D/A) conversion, frequency up conversion, filtering, amplification and transmission over the air-radio interface via antenna 46.

Microprocessor 32 also interfaces with further device subsystems such as auxiliary input/output (I/O) 48, serial port 50, display 52, keyboard 54, speaker 56, microphone 58, random access memory (RAM) 60, a short-range communications subsystem 62 and any other device subsystems generally labeled as reference numeral 64. To control access, a Subscriber Identity Module (SIM) or Removable user Identity Module (RUIM) interface 66 is also provided in communication with the microprocessor 32. In one implementation, SIM/RUIM interface 66 is operable with a SIM/RUIM card having a number of key configurations 68 and other information 70 such as identification and subscriber-related data including, for example, an Integrated Circuit Card ID (IC-CID).

Operating system software and software associated with transport stack 72 may be embodied in a persistent storage module (i.e., non-volatile storage) such as Flash memory 74. In one implementation, Flash memory 74 may be segregated into different areas, e.g., storage areas for computer programs 76, device states 78, address book 80, other personal information manager (PIM) data 82 and other data storage areas generally labeled as reference numeral 84. Additionally, a provisioning (PRV) logic module 86 is provided for provisioning certain aspects of MCD 30 according to the teachings set forth herein.

Figure 3:
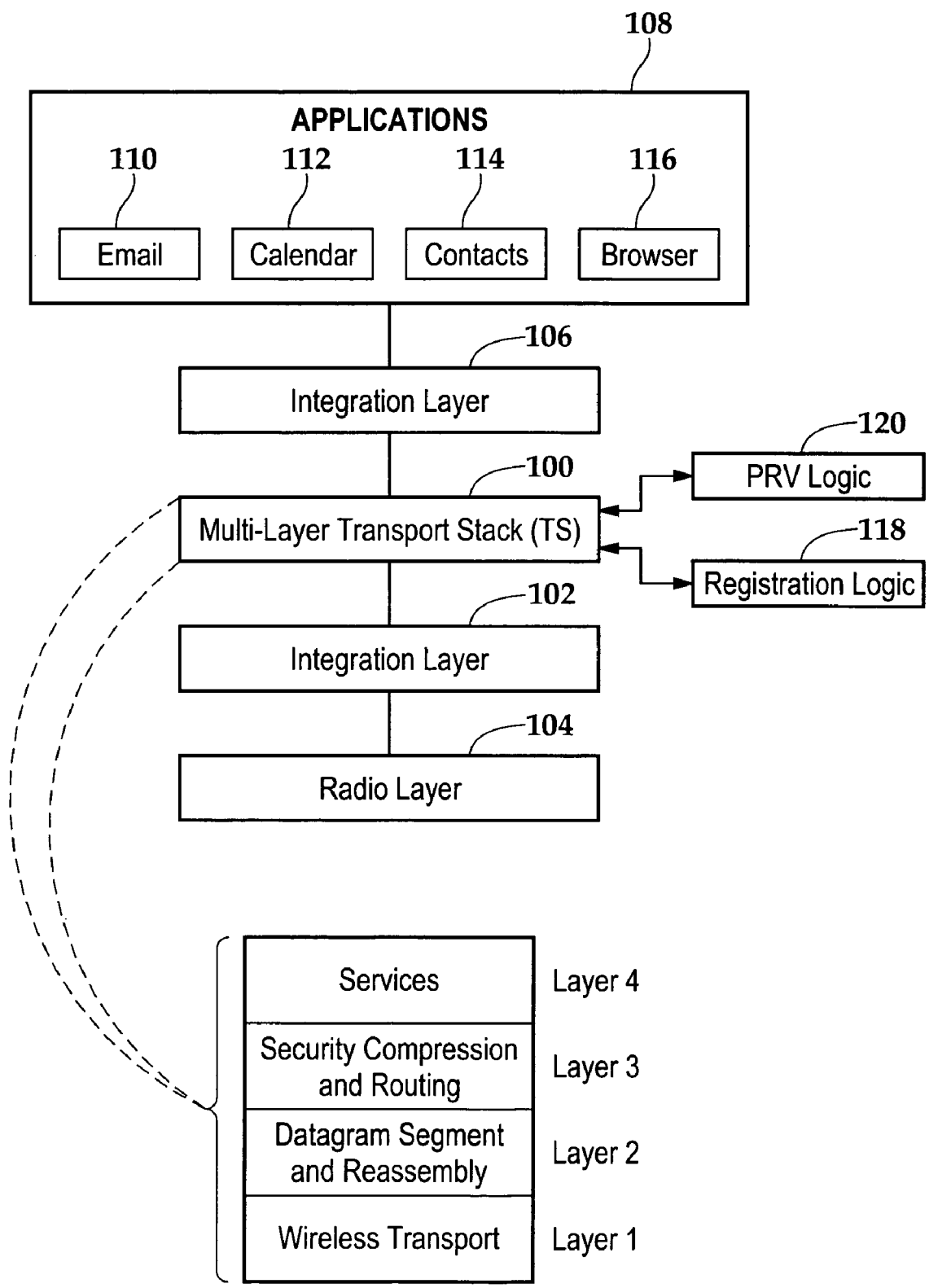
FIG. 3 depicts a software architectural view of a mobile communications device according to one embodiment of the present disclosure.

FIG. 3 depicts a software architectural view of a mobile communications device operable according to one embodiment for provisioning certain aspects of the MCD regardless of the manufacturer of the MCD or the wireless service provider. A multi-layer transport stack (TS) 100 is operable to provide a generic data transport protocol for any type of corporate data, including email, via a reliable, secure and seamless continuous connection to a wireless packet data service network. As illustrated in the embodiment of FIG. 3, an integration layer 102 is operable as an interface between the MCD's radio layer 104 and the transport stack 100. Likewise, another integration layer 106 is provided for interfacing between the transport stack 100 and the user applications 108 supported on the MCD, e.g., email 110, calendar/scheduler 112, contact management 114 and web browser 116. Although not specifically shown, the transport stack 100 may also be interfaced with the MCD's operating system. In another implementation, the transport stack 100 may be provided as part of a data communications client module operable as a host-independent virtual machine on a mobile device.

The bottom layer (Layer 1) of the transport stack 100 is operable as an interface to the wireless network's packet layer. Layer 1 handles basic service coordination within the exemplary network environment 10 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively.

FIG. 3 also depicts a registration logic module 118 provided as part of the MCD's software environment that is disposed in operable communication with the transport stack 100 as well as the OS environment for effectuating registration procedures, as and when needed, with the serving relay network. In one implementation, where a PIN is not otherwise provided or associated with the MCD, the registration logic module 118 includes logic means operable to execute a registration procedure with the serving relay node to request and receive a PIN, which will allow identification of the MCD by this network node during future communication sessions therebetween.

A PRV logic module 120 provided as part of the MCD's software environment is disposed in operable communication with the transport stack 100 as well as the OS environment. In one embodiment, the PRV logic module 120 comprises logic operable to generate a request including the PIN and at least one hardware device identifier associated with the MCD for transmission in a message to a network node such as the above mentioned serving relay node with an associated registration server, provisioning server and the like. As stated above, the PIN may be a required parameter in communications between an MCD and the serving relay node for identification and verification purposes. As one of ordinary skill in the art should appreciate, the hardware device identifier may comprise International Mobile station Equipment Identity (IMEI) parameters, International Mobile Subscriber Identity (IMSI) parameters, Electronic Serial Number (ESN) parameters, Mobile Identification Number (MIN) parameters, or the like, that are hard-coded into MCDs depending on the wireless network technologies and protocols. Additionally, the ICCID or IP addresses corresponding to the MCDs may also operate as device identifiers. The PRV logic module 120 may then receive from the network node a URL having a session ID appended thereto or otherwise associated therewith that may be based upon such techniques as hashing of the PIN, the hardware device identifier or both. Preferably, the session ID is sent in a secure communication using, for example, cryptography to protect the integrity of the session ID. Also, the session ID may include a timestamp used to indicate the duration in which the session ID will be valid. This URL and session ID is then available to browser 116 such that a communication session can be established between the MCD and an appropriate provisioning server such that certain aspects of the MCD may be provisioned.

Figure 4:
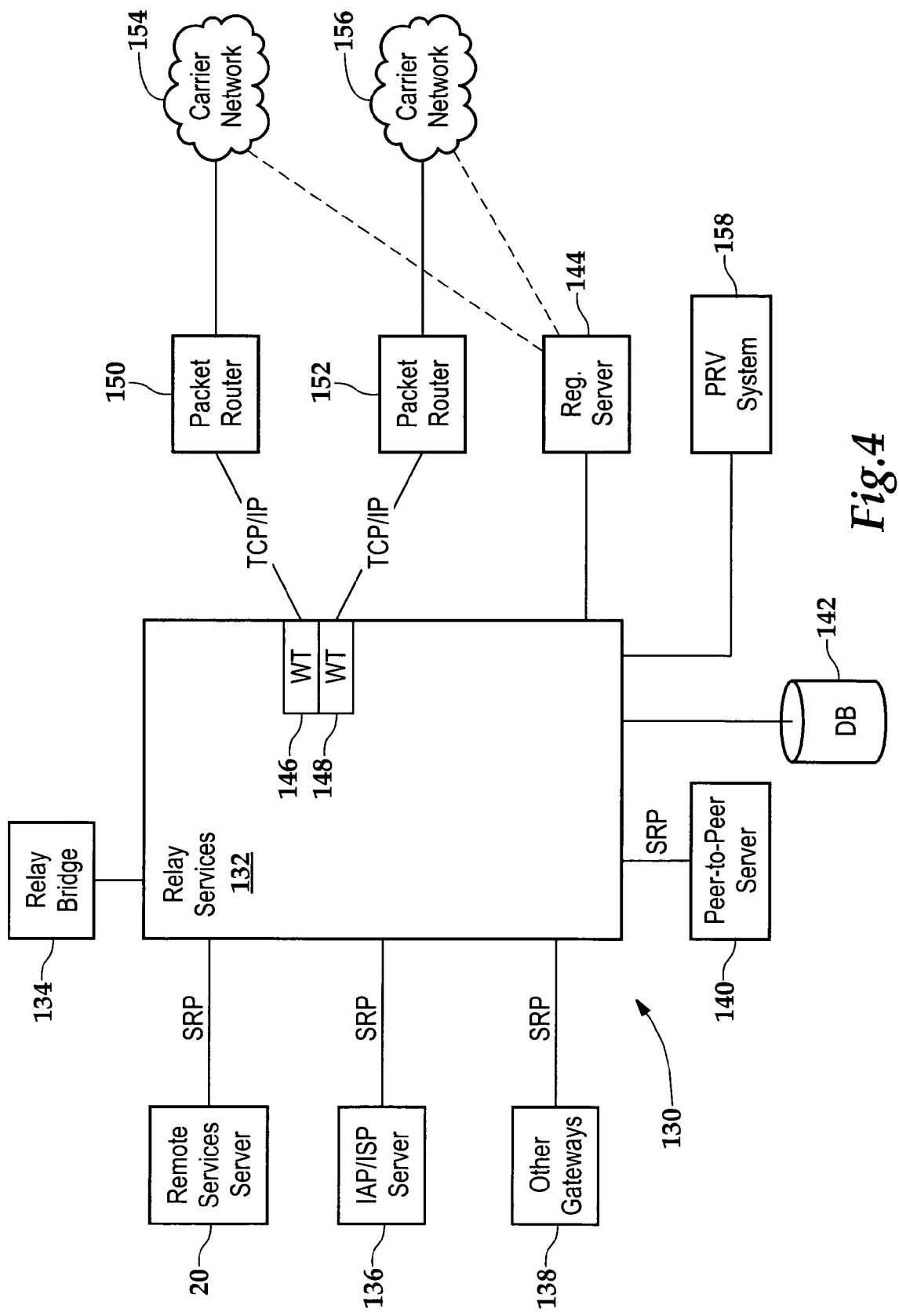
FIG. 4 depicts additional details of an exemplary relay network operable with a mobile communications device in accordance with an embodiment of the present disclosure.

FIG. 4 depicts additional details of an exemplary relay network infrastructure 130 operable as part of relay network 28 interfacing with the wireless packet data service network 12 described above. A relay services node 132 is operable, at least in part, for providing connectivity between MCDs and various data application services such as enterprise services, external IP data services and the like, regardless of the geographic location of the MCDs and their respective wireless carriers. Also, since multiple relay services nodes can co-exist in a distributed network architecture, a relay bridge 134 may be provided in operable connection with the relay services node 132 for supporting inter-relay connectivity. In one implementation, relay bridge 134 connects with separate relay node sites, forming tunnels between relays over which MCD messages can flow to and from services, irrespective of the region where the MCD is in.

Communication between the relay services node 132 and various application gateways and servers is effectuated using any suitable protocol, e.g., Server Relay Protocol (SRP), preferably over IP links. By way of illustration, remote services server 20 associated with the enterprise network 14 (shown in FIG. 1) communicates with the relay using SRP for effectuating internal data services with respect to the enterprise's mobile subscribers. Likewise, reference numerals 136 and 138 refer to external application gateways, such as Internet Service Provider (ISP) or Internet Access Provider (IAP) servers, and other gateways, respectively, which are also interfaced with the relay node 132 using SRP. A peer-to-peer server 140 may also be provided in operable connection with the relay node 132 for handling peer-level messaging between two MCDs.

Additionally, a database 142 may be provided in operable connection with the relay node 132 for handling and managing MCD location information. Preferably, this location information is stored by PIN of the MCDs, wherein the records maintain a particular device's last known location. A registration server 144 is operable for providing registration services for MCDs when they are initially activated or when the user re-registers due to moving to a different wireless network coverage area. In one implementation, the location information of registration server 144 may be programmed into an MCD. When the MCD registers successfully, registration server 144 is operable to provide the serving relay node's location, whereupon data sessions may be engaged by the MCD.

One or more wireless transport (WT) interfaces are provided as part of relay services node 132 for connecting with wireless carrier networks that service MCDs. By way of illustration, WT 146 and WT 148 communicate with respective packet routers 150 and 152 using TCP/IP links, which route data packets to and from respective wireless packet data service networks, exemplified in FIG. 4 as carrier network 154 and carrier network 156. Although not specifically shown, registration server 144, which handles administration and registration services for MCDs, may be provided with separate WT and packet routing for interfacing with the carrier networks 154, 156.

A provisioning system (PRV) 158 may be colocated, integrated or otherwise associated with the relay services node 132 for setting up and managing various service providers (i.e., carrier networks), subscribers, MCD manufacturers, resellers and other entities in order to support any number of service and market differentiation requirements. Additionally, the provisioning system 158 may include logic for provisioning personal information and preferences with respect to certain aspects of the MCDs when they are initially activated for the associated services. Also, subscriber validation logic may be provided as part of the provisioning system 158. Accordingly, the provisioning system 158 may be implemented with a plurality of interfaces with respect to the various modules of the relay services node 132, e.g., interfaces to registration servers, peer-to-peer servers, location databases and the like, in addition to including attendant service logic processing that may be realized in suitable hardware, firmware and/or firmware logic blocks as well as database structures.

Figure 5:
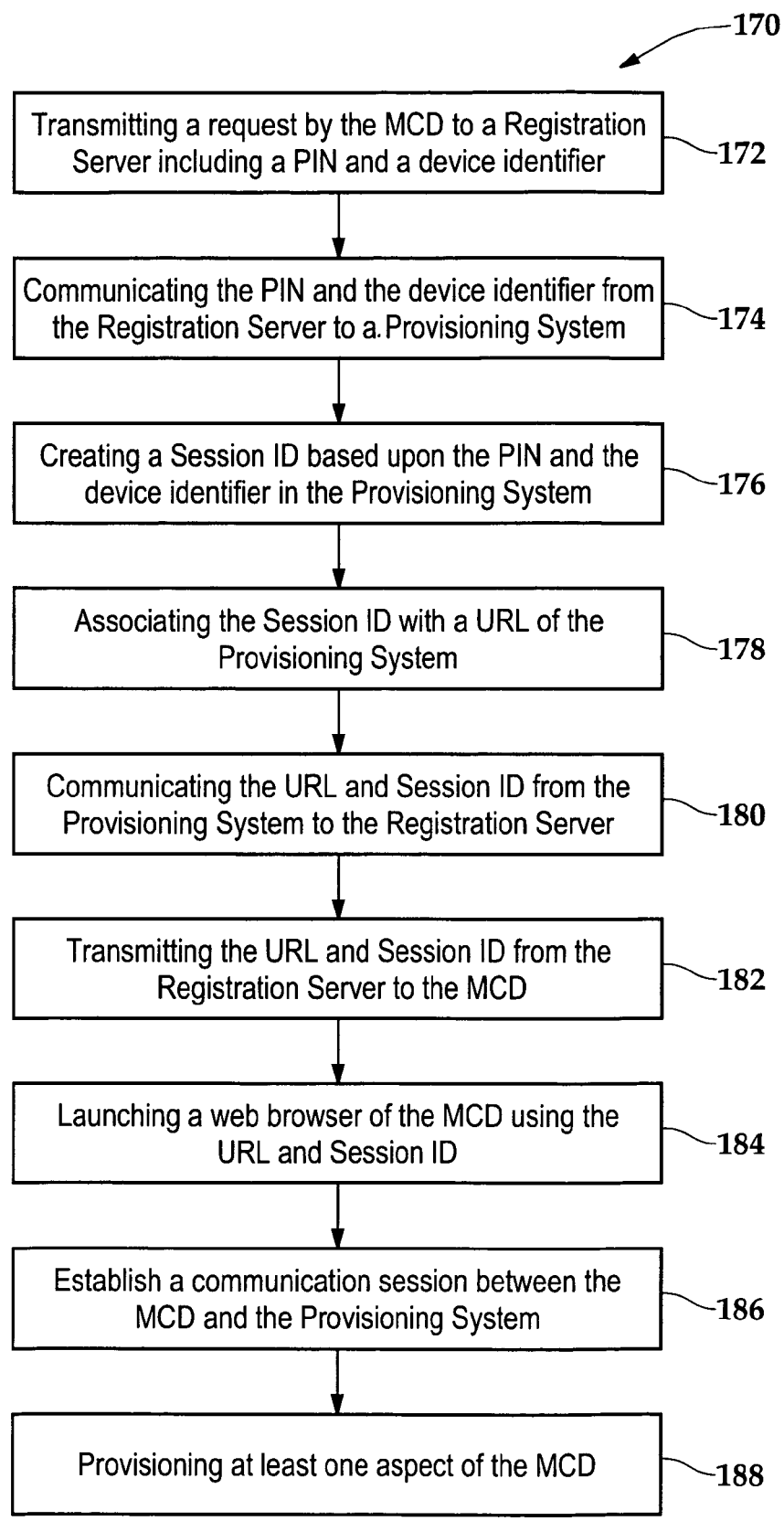
FIG. 5 depicts a flowchart of an embodiment for establishing a communication session for provisioning a mobile communications device.

FIG. 5 depicts a flowchart of an embodiment for establishing a communication session between a provisioning system and a mobile communications device. In the present embodiment, the communication session is a web client based communication session preferably using Wireless Application Protocol (WAP) or other suitable communication protocol. Prior to full utilization of the MCD, certain aspects of the device's overall functionality may need to be provisioned such as particular parameters to enable information to be pushed to the MCD. The provisioning of these aspects of the MCD may require authentication of the device, via a PIN, a device identifier or both, prior to provisioning. When the MCD is manufactured, one or more device identifiers such as IMEI, IMSI, ESN, MIN or the like are typically associated with the device. A PIN for these desires services, on the other hand, may not be assigned to the device upon manufacturing requiring the user to acquire such a PIN directly from the service provider via an over the air request and response sequence, which may take place with little or no user intervention. Additionally, once the MCD is deployed, it may be provided with an IP address since it is an IP appliance operable with a wireless packet data service network. Once the device has acquired the PIN relating to the aspects of the device the user desires to provision, it is now desirable to make the provisioning process as seamless as possible.

It has been found, however, that many applications including, for example, the web browsers used in MCDs are not capable of retrieving and using PIN and device identifier information. For example, the web browser may not have access to the integration layer of the transport stack. As such, the present disclosure provides for communicating such PIN information to the web browser to allow the web browser to establish a communication session with the appropriate provisioning system.

Specifically, as detailed in method 170 of FIG. 5, once the MCD has the appropriate PIN, the transport stack of the MCD can access the PIN and device identifier information and transmit a request to the registration server including the PIN and device identifier (block 172). This information is then communicated from the registration server to the provisioning system which may be colocated, integrate or otherwise communicably associated with the registration server (block 174). The provisioning system can then generate a session ID which is preferably based upon the PIN and the device identifier such as by using a hashing technique (block 176). The session ID can now be associated with a URL of the provisioning system such as by appending the session ID to the URL as one or more parameters (block 178). Preferably, the session ID includes a timestamp that establishes a time frame within which the session ID will remain valid. The provisioning system communicates the URL with session ID parameters to the registration server (block 180) which is still in communication with the MCD. The registration server then transmits the URL with session ID parameters to the MCD which receives this information via the transport stack (block 182). Once the MCD has obtained the URL with session ID parameters this information is passed to the web browser. In embodiments wherein only one PDP context is supported, the current PDP context between the MCD and the registration server may now be released. In other embodiment wherein multiple PDP contexts are supported, this release is not be necessary. In either case, the web browser now launches the web page associated with the URL which includes the session ID such that the device information of the MCD is known to the provisioning system (block 184). Once the web browser has launched the web page, the new PDP context is established between the MCD and the provisioning system (block 186). In this communication session, the aspects of the MCD that are associated with this service provider can now be provisioned over the air using well known data entry techniques via the web browser (block 188).

Figure 6:
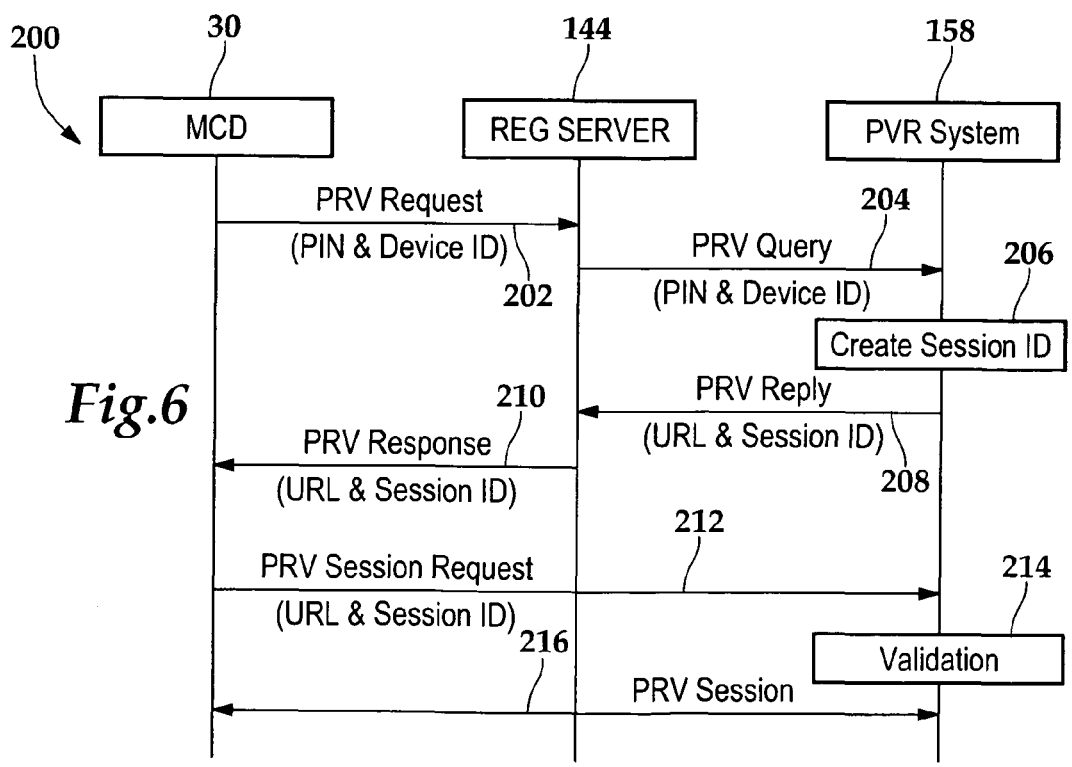
FIG. 6 depicts a message flow diagram with respect to establishing a communication session for provisioning a mobile communications device.

FIG. 6 depicts a message flow diagram with respect to establishing a communication session for provisioning a mobile communications device that is generally designated 200. A PRV request message 202 is transmitted by MCD 30 to a network node, e.g., registration server 144, wherein the request message 202 includes a PIN as well as a device identifier as parametric information. Registration server 144 queries suitable service logic, which may be embodied as the provisioning system 158 associated with the relay services network described above, by issuing a PRV query 204 thereto, which includes the parametric information received in the PRV request 202. The provisioning system's PRV logic is operable to validate the request and provide, via a PRV reply 208 to the registration server 144, a message including a URL having session ID parameters appended thereto. This information is then transmitted to MCD 30 via PRV response message 210 from registration server 144. Thereafter, a PRV session request 212 including the URL having session ID parameters may be executed by MCD 30. In response thereto, the PVR system 158 is operable to validate 214 the request to, among other things, assure that the session ID has not expired. Upon successful validation, a PRV session 216 between MCD 30 and PVR system 158 may occur to provision the associated aspects of MCD 30.

While this disclosure has described a mobile communications device operating within a network system with reference to illustrative embodiments, this description is not intended to be construed in a limiting sense. Various modifications and combinations of the illustrative embodiments as well as other embodiments, will be apparent to persons skilled in the art upon reference to the description. It is, therefore, intended that the appended claims encompass any such modifications or embodiments.

What is claimed is:

1. A method for provisioning a mobile communications device comprising:
   transmitting a request by the mobile communications device to a first network node, the request including a personal information number and at least one device identifier associated with the mobile communications device;
   receiving a response from the first network node by the mobile communications device, the response including a URL associated with a second network node and a session ID generated by the second network node, the session ID associated with the URL and based upon the personal information number and the at least one device identifier associated with the mobile communications device; and
   transmitting the URL and the session ID by the mobile communications device to the second network node to establish a communication session therewith to provision at least one aspect of the mobile communications device.

2. The method for provisioning a mobile communications device as recited in claim 1 wherein the first network node is operable as part of a relay network.

3. The method for provisioning a mobile communications device as recited in claim 1 wherein the second network node is operable as part of a provisioning system.

4. The method for provisioning a mobile communications device as recited in claim 1 wherein the at least one device identifier further comprises an International Mobile station Equipment Identity (IMEI) parameter corresponding to the mobile communications device.

5. The method for provisioning a mobile communications device as recited in claim 1 wherein the at least one device identifier comprises an International Mobile Subscriber Identity (IMSI) parameter corresponding to the mobile communications device.

6. The method for provisioning a mobile communications device as recited in claim 1 wherein the at least one device identifier comprises an Electronic Serial Number (ESN) parameter corresponding to the mobile communications device.

7. The method for provisioning a mobile communications device as recited in claim 1 wherein the at least one device identifier comprises a Mobile Identification Number (MIN) parameter corresponding to the mobile communications device.

8. The method for provisioning a mobile communications device as recited in claim 1 wherein the at least one device identifier comprises an Integrated Circuit Card ID (ICCID) parameter corresponding to the mobile communications device.

9. The method for provisioning a mobile communications device as recited in claim 1 wherein the session ID is generated based on hashing the personal information number and the at least one device identifier associated with the mobile communications device.

10. The method for provisioning a mobile communications device as recited in claim 1 wherein the transmitting and receiving steps are performed over a wireless packet data service network comprising one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (CDMA) network and a Universal Mobile Telecommunications System (UMTS) network.

11. The method for provisioning a mobile communications device as recited in claim 1 wherein the transmitting the URL and the session ID by the mobile communications device to a second network node must take places within a predetermined time window.

12. The method for provisioning a mobile communications device as recited in claim 1 wherein the first network node and the second network node are colocated.

13. The method for provisioning a mobile communications device as recited in claim 1 wherein the first network node and the second network node are integrated.

14. A mobile communications device comprising:
logic means operable to generate a request that is transmitted to a first network node, the request including a personal information number and at least one device identifier associated with the mobile communications device;
logic means operable to receive a response from the first network node, the response including a URL associated with a second network node and a session ID generated by the second network node, the session ID associated with the URL and based upon the personal information number and the at least one device identifier associated with the mobile communications device; and
logic means operable to establish a communication session with a second network node to provision at least one aspect of the mobile communications device by transmitting the URL and the session ID to the second network node.

15. The mobile communications device as recited in claim 14 wherein the at least one device identifier further comprises an International Mobile station Equipment Identity (IMEI) parameter corresponding to the mobile communications device.

16. The mobile communications device as recited in claim 14 wherein the at least one device identifier comprises an International Mobile Subscriber Identity (IMSI) parameter corresponding to the mobile communications device.

17. The mobile communications device as recited in claim 14 wherein the at least one device identifier comprises an Electronic Serial Number (ESN) parameter corresponding to the mobile communications device.

18. The mobile communications device as recited in claim 14 wherein the at least one device identifier comprises a Mobile Identification Number (MIN) parameter corresponding to the mobile communications device.

19. The mobile communications device as recited in claim 14 wherein the at least one device identifier comprises an Internet Protocol (IP) address corresponding to the mobile communications device.

20. The mobile communications device as recited in claim 14 wherein the at least one device identifier comprises an Integrated Circuit Card ID (ICCID) parameter corresponding to the mobile communications device.

21. The mobile communications device as recited in claim 14 wherein the session ID is generated based on hashing the personal information number and the at least one device identifier associated with the mobile communications device.

22. The mobile communications device as recited in claim 14 wherein the logic means operable to establish the communication session with a second network node to provision at least one aspect of the mobile communications device transmits the URL and the session ID to the second network node within a predetermined time window.

23. The mobile communications device as recited in claim 14 wherein the first network node and the second network node are colocated.

24. The mobile communications device as recited in claim 14 wherein the first network node and the second network node are integrated.

25. A network system for provisioning a mobile communications device comprising:
a first network node operable to receive a request transmitted by the mobile communications device, the request including a personal information number and at least one device identifier associated with the mobile communications device and provide a response to the mobile communications device, the response including a URL and a session ID based upon the personal information number and the at least one device identifier associated with the mobile communications device; and
a second network node operable to receive a query by the first network node that includes the personal information number and the at least one device identifier associated with the mobile communications device, generate the session ID, associate the session ID with the URL and transmit a reply to the first network node that includes the URL and the session ID and establish a communication session with the mobile communications device to provision at least one aspect of the mobile communications device upon receiving the URL and the session ID transmitted by the mobile communications device.

26. The network system as recited in claim 25 wherein the first network node is operable as part of a relay network.

27. The network system as recited in claim 25 wherein the second network node is operable as part of a provisioning system.

28. The network system as recited in claim 25 wherein the at least one device identifier further comprises an International Mobile station Equipment Identity (IMEI) parameter corresponding to the mobile communications device.

29. The network system as recited in claim 25 wherein the at least one device identifier comprises an International Mobile Subscriber Identity (IMSI) parameter corresponding to the mobile communications device.

30. The network system as recited in claim 25 wherein the at least one device identifier comprises an Electronic Serial Number (ESN) parameter corresponding to the mobile communications device.

31. The network system as recited in claim 25 wherein the at least one device identifier comprises a Mobile Identification Number (MIN) parameter corresponding to the mobile communications device.

32. The network system as recited in claim 25 wherein the at least one device identifier comprises an Integrated Circuit Card ID (ICCID) parameter corresponding to the mobile communications device.

33. The network system as recited in claim 25 wherein the session ID is generated based on hashing the personal information number and the at least one device identifier associated with the mobile communications device.

34. The network system as recited in claim 25 wherein the first and second network nodes interface with a wireless packet data service network comprising one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (CDMA) network and a Universal Mobile Telecommunications System (UMTS) network.

35. The network system as recited in claim 25 wherein the second network node must receive the URL and the session ID within a predetermined time window in order to establish the communication session.

36. The network system as recited in claim 25 wherein the first network node and the second network node are colocated.

37. The network system as recited in claim 25 wherein the first network node and the second network node are integrated.

* * * * *

UNITED STATES PATENT AND TRADEMARK OFFICE
CERTIFICATE OF CORRECTION

PATENT NO. : 7,835,722 B2  
APPLICATION NO. : 10/981424  
DATED : November 16, 2010  
INVENTOR(S) : Arun Munje et al.

Page 1 of 1

It is certified that error appears in the above-identified patent and that said Letters Patent is hereby corrected as shown below:

In the drawings, Sheet 1, Fig. 6, the reference numeral 158 directed to a "PVR System" should instead read --PRV System--.

Signed and Sealed this  
Twenty-sixth Day of November, 2013

Margaret A. Focarino  
*Commissioner for Patents of the United States Patent and Trademark Office*